Figure 1:
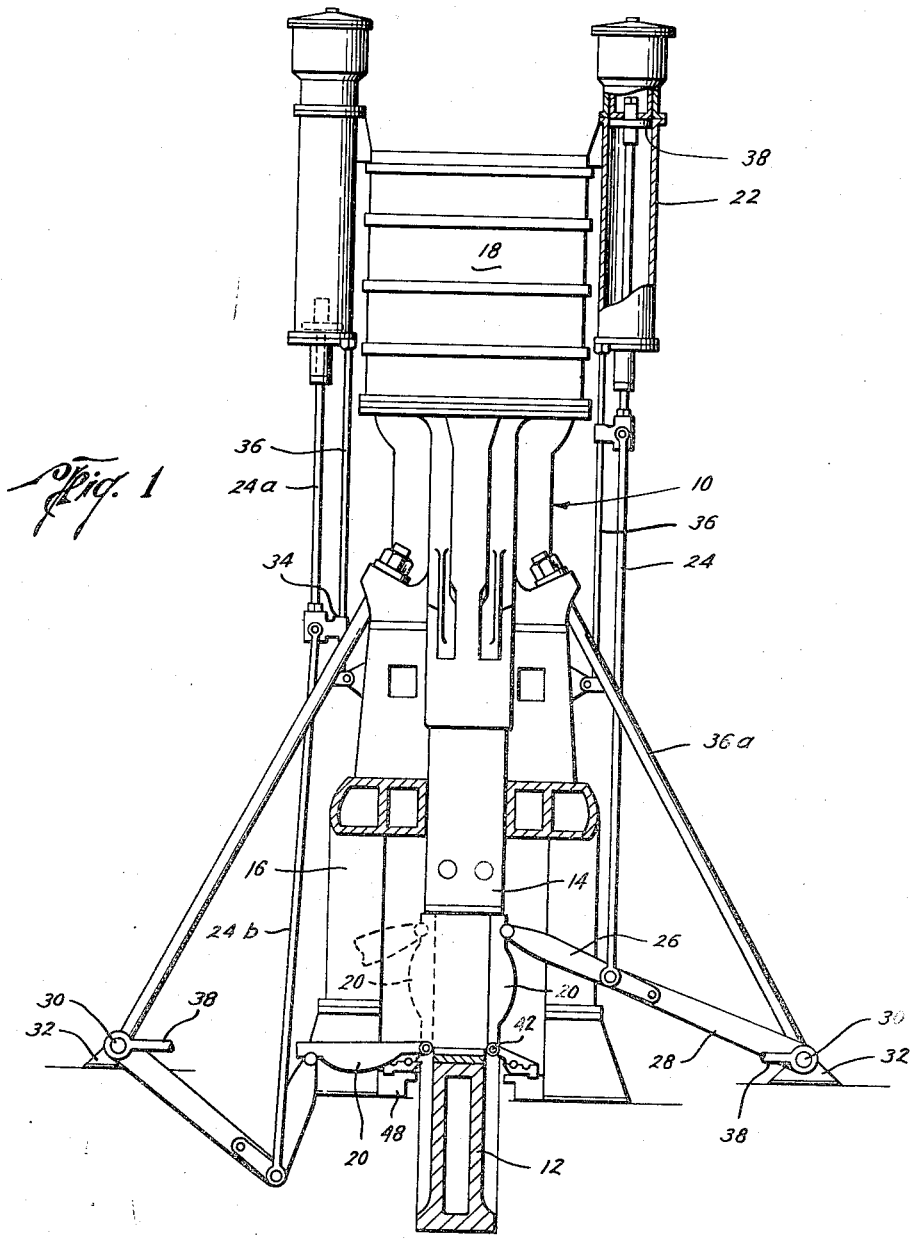

Sept. 28, 1954  A. C. SINCLAIR  2,690,115
APPARATUS FOR CONTROLLING ROLLING BALES
Filed April 2, 1953  4 Sheets-Sheet 1

Alfred C. Sinclair
INVENTOR.

BY James F. Weiler

ATTORNEY

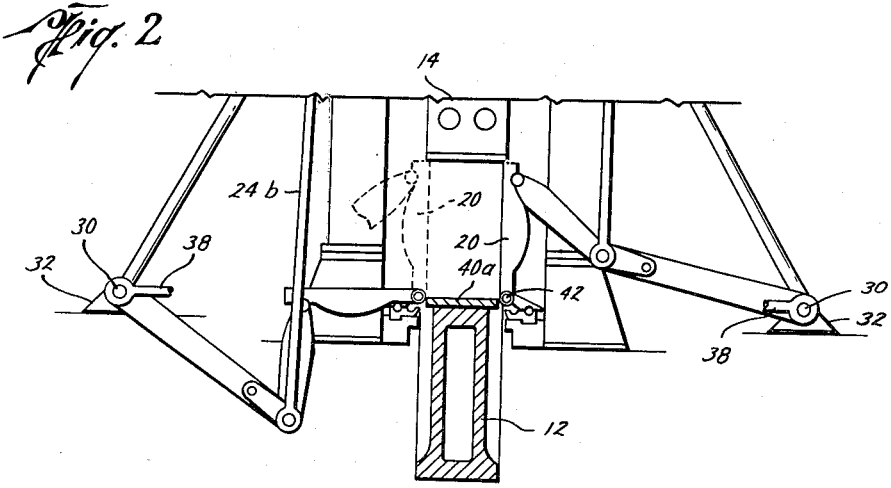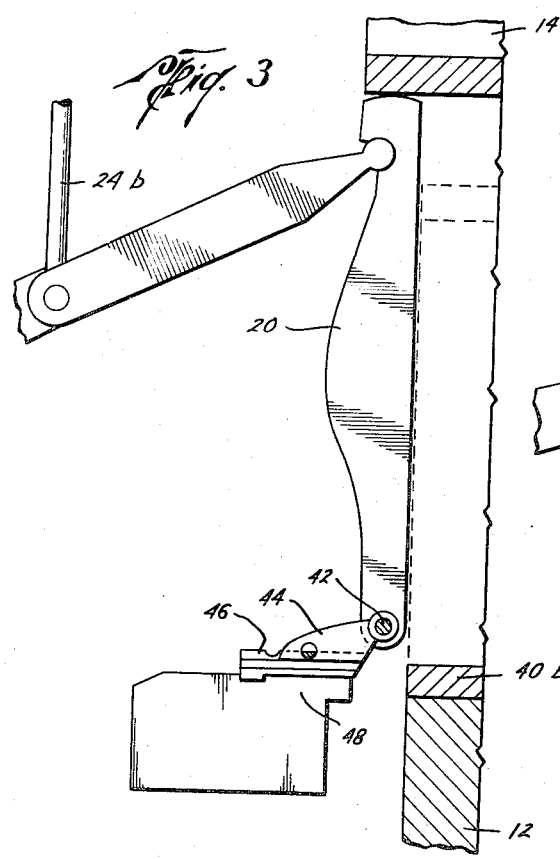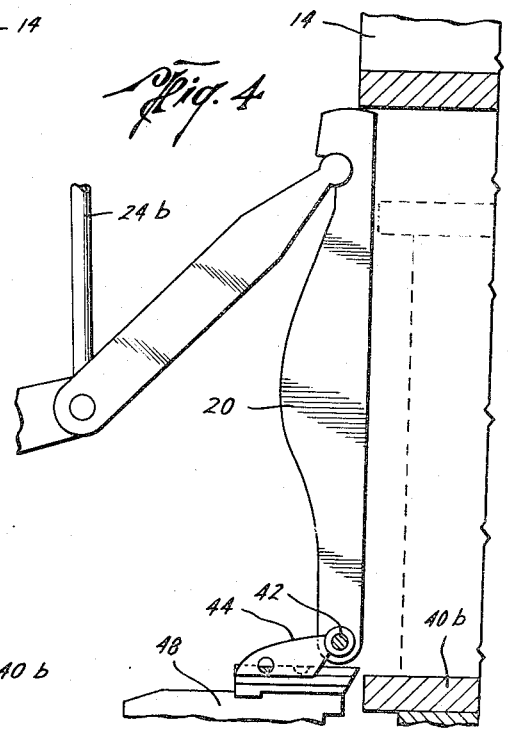

Sept. 28, 1954   A. C. SINCLAIR   2,690,115
APPARATUS FOR CONTROLLING ROLLING BALES
Filed April 2, 1953   4 Sheets-Sheet 3
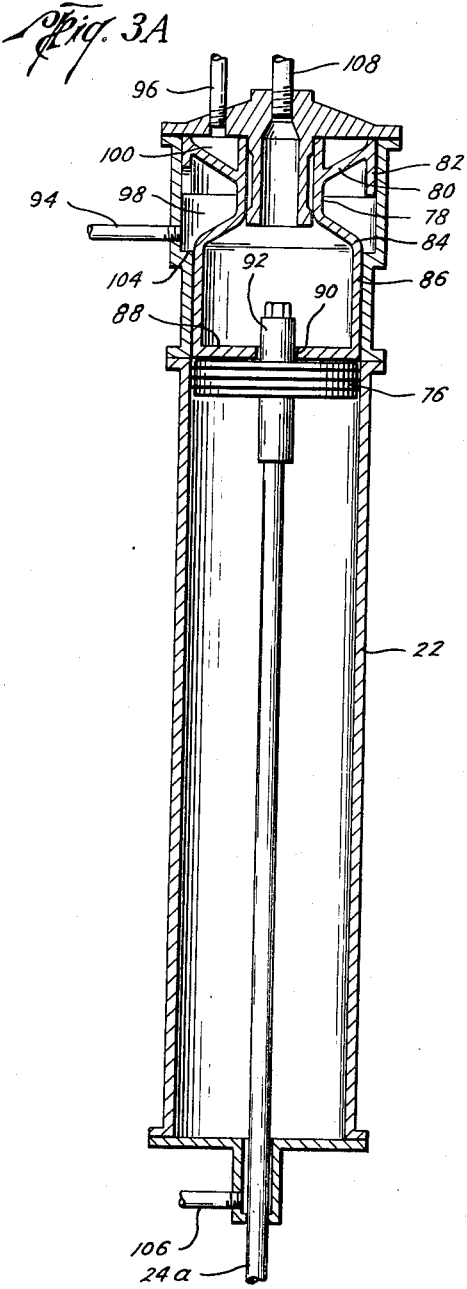
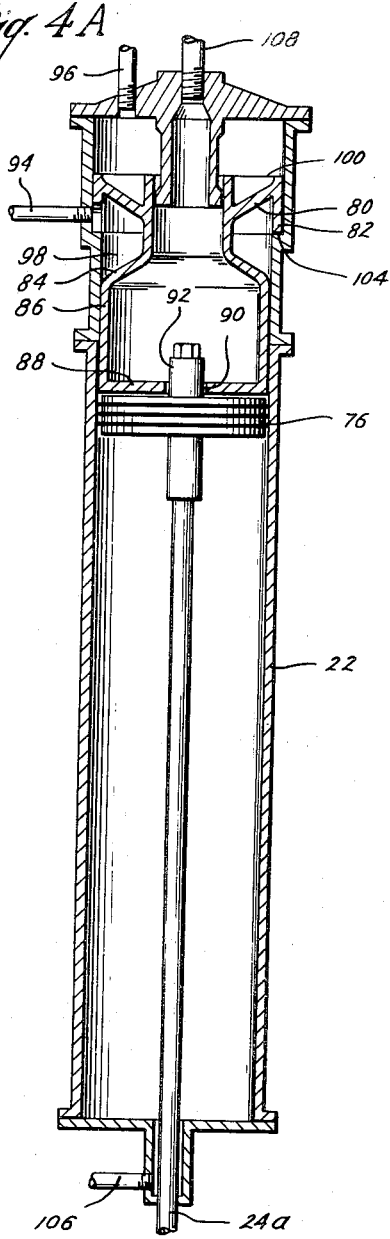
Alfred C. Sinclair
INVENTOR.
BY James F. Weiler
ATTORNEY Sept. 28, 1954  A. C. SINCLAIR  2,690,115
APPARATUS FOR CONTROLLING ROLLING BALES
Filed April 2, 1953  4 Sheets-Sheet 4
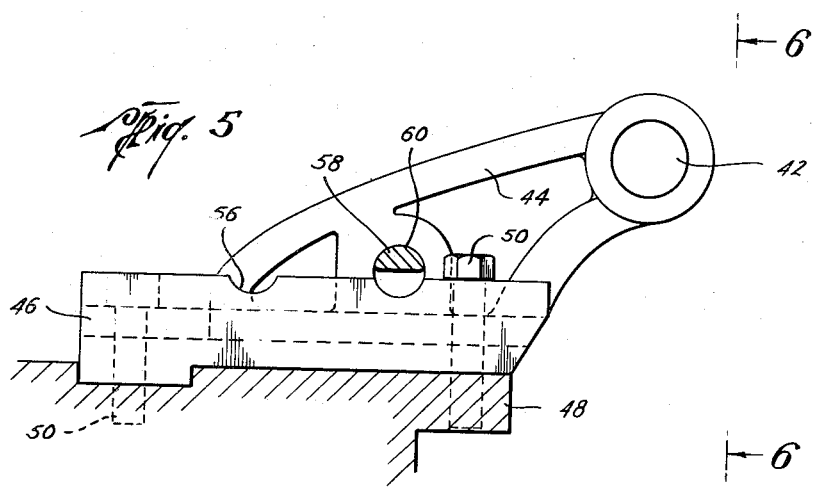
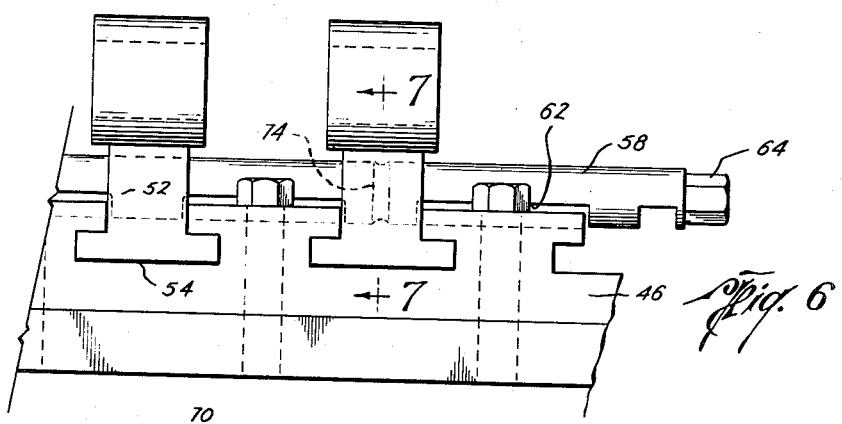
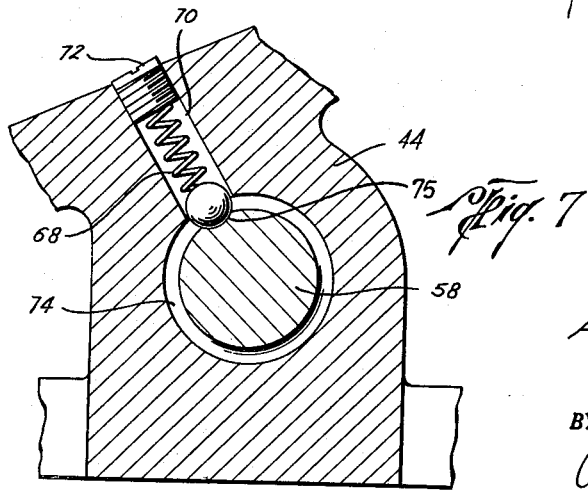
Alfred C. Sinclair
INVENTOR.
BY James F. Weiler
ATTORNEY Patented Sept. 28, 1954

2,690,115

UNITED STATES PATENT OFFICE 2,690,115

APPARATUS FOR CONTROLLING ROLLING BALES

Alfred C. Sinclair, Houston, Tex., assignor to Anderson, Clayton & Co., Houston, Tex., a corporation of Delaware Application April 2, 1953, Serial No. 346,425

12 Claims. (Cl. 100—232)

The present invention relates to cotton compresses and more particularly to apparatus for controlling rolling bales.

In compressing bales of cotton for transportation and storage purposes the so-called Webb press has been in use in the United States for many years. Hydraulic presses are and can be used, and are used particularly in foreign countries.

It is the practice in compressing bales of cotton for transportation and storage purposes to further compress the lightly compressed gin or low density bales into so-called standard-density bales and high-density bales, the latter generally called high-D bales in the trade. In general, the loosely compressed gin bales are compressed into standard-density bales for transportation and storage or transportation to mills in this country. The high-density bales are used primarily in connection with foreign transportation and trade because they occupy less space and the foreign mills have equipment by which the high-density bales may efficiently be utilized.

In conventional high-density cotton compresses presently in use, such as the Webb press, side doors or side-door attachments are provided and utilized in compressing high-density bales, and a high-density channel plate is ordinarily provided on the lower platen. When it is desired to use the compress for compressing standard-density bales, the high-density channel plate is removed and a standard-density channel plate is placed on the lower platen and the side doors are not used.

Many times the lightly-compressed gin bales are of irregular configuration and as the bale is being compressed between the lower and the upper platens of the compress, the bale will roll or spring out of the compress and there is nothing but the weight of the moving members to stop the compressing action of the compress. Tremendous pressures are provided in the compresses and these so-called rolling bales are the chief cause of major wrecks to the compresses as well as causing many major accidents and killing workers working around and about the compress. It is an exceedingly serious matter when a compress is wrecked because of the great expense of making repairs as well as the time involved and resultant loss of revenue during the shut-down period in view of the seasonal nature and therefore relatively short period during which cotton is compressed.

In addition, standard-density bales are not of uniform dimensions which interferes to an extent with efficient storing of the bales in warehouses, freight cars and the like.

It is, therefore, an object of the present invention to provide a cotton compress having a rolling bale attachment by which both standard-density and high-density bales of substantially uniform dimensions may be compressed and which effectively prevents rolling or springing of bales out of the compress with the resultant damage to the compress and injury to workers working about the compress and the resulting expense, loss of revenue and life.

It is yet a further object of the present invention to provide a rolling bale attachment for high-density cotton compresses which facilitates the compressing of either standard-density or high-density bales by making a quick and simple adjustment thereby avoiding rolling bales or springing of the bales out of the compress with the attendant damage to the compress and operators thereof and loss of revenue and life.

It is yet a further object of the present invention to provide an improved compress and a rolling-bale attachment for a compress in which standard-density bales as well as high-density bales of cotton are formed of substantially uniform dimensions thereby facilitating storing in warehouses, freight cars and the like.

In the compressing of standard bales of cotton considerable man hours are consumed in manually pushing the loose gin bale of cotton into position in the compress and centralizing the load on the press. Accordingly, it is a further object and advantage of the present invention to provide a rolling bale or side-door attachment in which a bale of cotton may be placed in the compress and the bale is self-centered in the press thereby centralizing the load on the press and avoiding the loss of man hours resulting in manually pushing the bale into a centralized position.

In conventional compresses now used, such as the Webb press, the standard-density channel plate at the bottom platen occupies a space beginning at the center of the side doors and projects upwardly, ordinarily about seven inches, with side extensions overlapping the doors. Many times, the lightly-pressed gin bale exceeds the space between the upper and lower platens when the lower channel plate of the standard-density press is used. In addition to making it more difficult to manually place the lightly-pressed gin bale between the upper and lower platens, the full capacity of the press is not available for pressing standard bales because the effective stroke is decreased by the additional distance, about seven inches, which the standard-density channel plate occupies. Thus, the platen-lifting arms are not able to move throughout their entire lifting arc and, toward the end of the arc, the effective lifting force is multiplied many times. Thus, the compressing power is multiplied many times at the upper end of the stroke, which stroke in compressing standard-density bales is not reached to the extent the lower channel plate extends upwardly thereby greatly reducing the efficiency and compressing power of the press.

It is a feature and advantage of the present invention to provide an improved compress and an attachment for a compress by which more space is provided between the upper and lower platens thereby permitting lightly-pressed gin bales to more readily be inserted in the press, and which permits of the full compressing power of the compress. That is, the effective stroke is increased by the distance, seven inches in a Webb press, and the platen-lifting arms are able to advance over the entire lifting arc. Since the movement of the piston varies from approximately one half the platen movement at the lower end before compressing to approximately seven times the platen movement at the upper end, the compressing power at the upper end of the stroke is multiplied to approximately seven times the available total cylinder pressure.

It is yet a further object of the present invention to provide a side-door attachment for cotton compresses by which a change may be made from compressing high-density to standard-density bales, or vice versa, which requires merely a simple adjustment of the hinge brackets to which the side doors are connected and an appropriate repositioning of cushioning pistons provided in the side door power means by a simple adjustment, along with a change of bottom platen channel plates.

It is yet a further object of the present invention to provide a simplified hinge plate assembly in combination with a cotton compress by which the doors may be adjusted for standard- or high-density compressing by a relatively simple and quick adjustment.

Other objects, features and advantages of the invention will be apparent from a following description of an example constructed in accordance with the invention, taken in connection with the accompanying drawings, where like character references designate like parts throughout the several views, and where Figure 1 is a diagrammatic elevation, partly in section, of a side-door attachment or rolling-bale attachment constructed according to the invention, illustrated in combination with a Webb compress, and shown in position for compressing high-density bales, Figure 2 is a fragmentary view of the lower portion of the compress illustrated in Figure 1, and shown in position for compressing standard-density bales, Figure 3 is a fragmentary, front elevation, partly in section, of the side-door attachment, and illustrated in a position to compress high-density bales of cotton, Figure 3A is a sectional elevation illustrating a side-door piston and cylinder assembly, and shown in position for compressing high-density bales, Figures 4 and 4A are views similar to those of Figures 3 and 3A, respectively, but illustrate the side-door attachment and piston and cylinder assembly in position so that standard-density bales of cotton are compressed, Figure 5 is a sectional side view of movable interfitting hinge brackets and stationary hinge plates constructed according to the invention and for pivotally receiving the side doors, Figure 6 is a front view taken along the line 6—6 of Figure 5 and looking in the direction of the arrows, and Figure 7 is a cross-sectional, fragmentary view, taken along the line 7—7 of Figure 6, looking in the direction of the arrows, and illustrates a detent means to maintain the locking rod in position.

Referring now to the drawings, and particularly to Figure 1, the reference numeral 10 generally designates a standard high-density Webb cotton compress which has been improved in accordance with the invention. The compress 10 includes a lower platen 12 which is movable upwardly and an upper fixed platen 14 and various structural and supporting members for the compress, all generally indicated by the reference numeral 16.

A main piston and cylinder arrangement 18 is provided to move the lower platen 12 upwardly toward the upper platen 14 by linkage (not shown) to compress bales of cotton placed therebetween.

In high-density compresses, a pair of side doors 20 are hingedly secured proximate the upper portion of the lower platen 12, which doors are actuated by the side-door piston and cylinder assemblies generally indicated by the reference numeral 22 by means of the side-door lifting links 24 pivotally connected to the blades 26, which in turn are pivotally connected at their inner ends to the side doors 20 and at their outer ends to the side-door struts 28, which in turn are connected by the heel pins 30 to the heel pin saddles 32. The links 24, blades 26 and struts 28 comprise in effect toggles, and, in practice, the blades 26 and struts 28 should not be moved to a position beyond dead center because of the difficulty encountered in moving them back to retract the side doors 20.

For ease of illustration, the side doors 20 and associated parts on the right hand of Figures 1 and 2 are illustrated in a compressing position; whereas, the side door 20 and associated parts on the left-hand side of these figures are illustrated in a retracted or lowered position. It is understood, of course, that the side doors 20 work in unison, that is, both side doors will be in a lowered or compressing position in actual operation.

The side-door lifting links 24 may comprise two members 24a and 24b pivotally joined together, the upper side-door lifting link 24a having a crosshead guide shoe 34 which moves along the side-door guide rod 36 in order to provide proper alignment for the movement of the piston 38 in the side-door cylinders 22.

The batter braces 36a are provided and are secured to the compress 16, as illustrated, and the heel pin saddles 32, as are the side rods 38 which extend around the ends of the compress. Thus, as the side doors 20 are swung into compressing position, lines of force are provided downwardly and outwardly of the blades 26 and struts 28 and the batter braces 36 and tie rods 38 provide required support. While only one end of the compress is illustrated, this arrangement of parts is provided on the other end of the compress in the usual manner.

The operation and arrangement of parts in the Webb cotton compress are well known to the art, constitute no part of the present invention, and, accordingly, no further description thereof is deemed necessary.

As best seen in Figures 2 and 4, what may be called a standard channel plate 40a is provided on the lower platen 12, which channel plate is of such size that it may move upwardly between the side doors 20 when they are in compressing or substantially vertical position. What may be called a high-density channel plate 40b, see Figure 3, is placed on the lower platen 12 and of such a width that it moves upwardly within the doors 20 when they are in compressing position or vertical position for compressing high density bales. It is noted that other than a difference in the widths of the channel plates 40a and 40b that these channel plates are similar and that substantially the same amount of space is provided between the upper surface of each of these channel plates and the lower surface of the upper platen 14. Thus, the full benefit of the stroke of the compress is obtained in compressing standard-density bales as well as in compressing high-density bales which, heretofore, was not possible.

In order that the side doors 20 may be used in compressing standard-density bales as well as high-density bales, means are provided to hingedly and adjustably position the side doors 20 so that the side doors may be moved outwardly or inwardly the required amount. As best seen in Figures 3 and 4, the side doors 20 are hinged at their lower portions by means of the hinge pins 42 to the hinge brackets 44 adjustably secured to the substantially stationary hinge plates 46, which are in turn secured to the bed plates 48.

Referring now to Figure 5, the hinge plates 46 may be secured to the bed plates 48 in any suitable manner, such as by the bolts 50. The hinge brackets 44 are slidably secured in the hinge plates 46. This may be accomplished by providing the lower portion of the hinge brackets 44 in the form of inverted T's 52 which fit in the laterally-extending T-slots 54 formed in the hinge plates 46, as best seen in Figure 6. Thus, the lower portions of the hinge brackets 44 slidably interfiit in the hinge plates 46 by means of the interfitting portions 52 and 54.

Means are provided to lock the hinge brackets 44 in adjusted position in the hinge plates 46 and, for this purpose, the circular arcuate recesses 56 are provided in the upper surface of the hinge plates 46, which recesses 56 receive the locking rod 58. The hinge brackets 44 have the circular apertures 60 through which the locking rod 58 extends.

As best seen in Figure 6, the locking rod 58 is substantially round in cross section, but has the flats 62 spaced intermediate each hinge bracket 44 so that by rotating the locking rod 58 in the position illustrated in Figure 6 the hinge brackets 44 may be moved in the T-slots 54 for the purpose of adjusting their position and thereby the position of the side doors 20. By rotating the locking rod 60 half a turn when the rod is adjacent the circular arcuate recesses 56, the hinge brackets 44 are locked in place in the hinge plates 46. To facilitate turning the locking bar 58 a conventional nut 64 may be provided at its ends so that a suitable wrench, not shown, may be secured thereto and rotated to rotate the locking bar 58.

In order that the locking bar 58 may be properly aligned with respect to the hinge brackets 44 and the hinge plate 46 detent means are provided in one or more of the hinges 44 and at cooperating places in the locking bar 58. A satisfactory detent means is illustrated in Figure 7 which illustrates the ball 66 pressed into position by the compression spring 68 in the opening 70 formed in the adjustable hinge bracket 44 and held in position by means of the threaded pin 72. As illustrated, the ball 66 is pressed into a circumferential recess 74 in the locking rod 58, the recess being better illustrated in Figure 6. Preferably, the detent means should prevent unintentional longitudinal and rotational movement of the locking bar, and to prevent rotational movement, the circumferential recess 74 should be further recessed at 75. Any satisfactory detent arrangement may be utilized.

Thus, the locking rod 58 is releasably held and maintained longitudinally and rotationally with respect to the adjustable hinge brackets 44 and the hinge plates 46 by means of suitable detent means, which may be provided at one or more places where the locking rod 58 extends through the hinge brackets 44.

In order that the upper ends of the side doors may be swung upwardly and inwardly an appropriate distance, means are provided for controlling the upward movement of the side-door lifting links 24a and 24b. For example, in compressing high-density bales, the side-door lifting links move upwardly a greater distance to move the upper ends of the side doors 20 inwardly a greater distance, as best seen in Figure 3. When it is desired to compress standard-density bales, the upper ends of the side doors 20 should not be moved inwardly to the same extent as in the high-density compressed bales, but should move inwardly approximately to the position illustrated in Figure 3 in order that the standard-density bales may be of substantially uniform dimensions so that they may be easily and readily stored in warehouses and in freight cars. Such a suitable means is illustrated in Figures 3a and 4a.

Referring now to these figures, the conventional pistons 76 are secured to the upper ends of the side-door lifting links 24a and are slidable in the side-door piston cylinders 22. At the upper end of the piston cylinders 22 there are provided the sleeves 78 which, in effect, are dummy heads which limit upward travel of the pistons 76. The sleeves 78 have the outwardly and upwardly extending flanges 80, which have the circumferentially-extending sleeve elements 82 at their outer ends. The sleeves 78 have the downwardly and outwardly converging flange portions 84, which have the downwardly-extending sleeve portions 86 and the inwardly-turned ends 88 which engage and stop the pistons 76 in their upward travel. As illustrated, the shoulder portions 88 each have a central aperture 90 through which the piston connecting elements 92 may extend as well as permitting steam to escape from the cylinders 22.

Steam lines 94 and 96 are connected in the upper ends of the cylinders 22 into chambers 98 and 100, respectively. When steam is permitted to flow into chambers 98 through lines 94, the dummy heads will be forced into an upward position as illustrated in Figure 3a. When steam is supplied to the chambers 100 through the lines 96, the dummy heads 78 will move downwardly until the lower portion of the sleeves 82 engage the upwardly-facing shoulders 104 at the upper ends of the cylinders 22, thereby stopping the downward movement of the dummy heads 78. In this case, the upward travel of the pistons 76 is limited by their engagement with the shoulder portions 88 which have been moved downwardly from the position illustrated in Figure 3a. This effectively limits the upward travel of the side-door lifting links so that the upper ends of the side doors 20 will be moved upwardly and inwardly the proper distance.

As illustrated, steam is provided and exhausted from the cylinders 22 by means of the steam lines 106 and 108 which includes conventional valve arrangements (not shown). Also, suitable stuffing boxes, packing and usual elements are used which are not illustrated.

In operation, assuming that high-density bales of cotton are to be compressed, the side-door hinge brackets 44 will be in the position illustrated in Figures 1, 3, 5 and the dummy heads 78 in the position illustrated in Figure 3a. The loosely-ginned bales are placed on the lower channel member and first, as usual, the side doors compress the sides of the bale of cotton, the lower platen 12 then being raised and the bale of cotton compressed between the upper and lower platens. The side doors are then retracted and metal straps are placed about the bales in the usual manner, the lower platen 12 then being lowered and the bale rolled out of the compress and the next loosely-ginned bale rolled into place. Due to the fact that the side doors move upwardly and inwardly, the loosely-ginned bale of cotton is automatically centered in the compress to provide a centralization of the upward thrust of the lower platen 12 as it moves upwardly.

If it is desired to compress standard-density bales of cotton, by suitable valves, not shown, steam may be admitted into chambers 100 to move the dummy heads 78 into the lower position illustrated in Figure 4a, the locking bolt 58 may be rotated half of a turn by applying a wrench to the nut 64, and the locking bolt 56 and adjustable hinge brackets 44 slid along the tops of the hinge plates 46 until the locking bolt is over the next set of longitudinally-aligned recesses 56, at which point the locking bar may be rotated half of a turn to move the rounded portions of the locking bar into the recess and thereby lock the adjustable hinge brackets 44 in the position illustrated in Figures 2 and 4. The high-density channel plate 40b is removed and the standard-density channel plate 48 is placed on top the lower platen 12. Thus, the change over from compressing high-density bales of cotton to standard-density bales of cotton is accomplished readily and quickly and in a matter of a few minutes. It is further noted that the "daylight" space between the upper surface of the standard channel plate 40a and the lower surface of the upper platen 14 is substantially the same as that when the high density channel plate 40b is used thereby permitting a full stroke in compressing standard-density bales of cotton.

The operation is the same as that described in connection with compressing high-density bales of cotton except that the upper ends of the side doors 20 do not move inwardly as far nor do the pistons 76 move upwardly as far so that the side doors 20 assume the position illustrated in Figures 2 and 4. As in the case of compressing high-density bales, the bales may be rolled upon the lower channel plate 40a and are automatically centered between the side doors 20 so that the load on the compress is centralized.

Thus, the manner of operation is the same as that described above, the only difference being in the adjustment of the cylinders 22, of the hinge brackets 44 and a different lower channel plate.

Thus, it is apparent that the present rolling bale attachment and a compress constructed according to the invention have the advantages set forth and attain the objects mentioned as well as others inherent therein.

While a single embodiment of the invention is given for the purpose of the disclosure, it is apparent that changes in details and arrangements of parts will suggest themselves to those skilled in the art and which are included in the spirit of the invention and the scope of the appended claims. Also, that the principles of the invention may be applied to any compress known to the art.

It is, therefore, desired to be limited only by the spirit of the invention and the scope of the appended claims.

What is claimed is:

1. In a compress of the type having a fixed upper platen, a movable lower platen, a pair of side doors hingedly mounted on opposite sides of said lower platen, and separate power means for swinging the side doors to compressing position and moving the lower platen upwardly for compressing a bale of cotton, the improvement comprising a pair of substantially stationary hinge plates mounted at opposite sides of said lower platen, hinge brackets, said hinge plates and hinge brackets provided with interfitting guideways and guide projections for movably securing the hinge brackets to the hinge plates, and means to lock the hinge brackets in adjusted position in said hinge plates, said side doors being hingedly connected to said hinge brackets.

2. In a compress of the type having a fixed upper platen, a movable lower platen, a pair of side doors hingedly mounted at opposite sides of the lower platen, and separate power means for swinging the side doors to compressing position and for moving the lower platen upwardly for compressing a bale of cotton, the improvement comprising a pair of substantially stationary hinge plates mounted at opposite sides of said lower platen, said hinge plates being provided with laterally extending inverted T-slots disposed in spaced parallel relation, said hinge plates being also provided with a plurality of laterally-spaced sets of longitudinally-aligned semi-circular grooves in the top thereof, hinge brackets having inverted T-shaped bases slidable in said inverted T-slots and aligned circular apertures proximate the tops of said hinge plates, and a cylindrical locking bar extending through the apertures and seating in one set of grooves, said bar having a flat portion between each hinge bracket whereby the locking bar may be rotated to permit the hinge brackets to slide to another of the sets of aligned grooves and there rotated to lock said hinge brackets to said hinge plates, said side doors being hingedly connected to said hinge brackets.

3. In a compress of the type having a fixed upper platen, a movable lower platen, a pair of side doors hingedly mounted on opposite sides of said lower platen, a first piston and cylinder arrangement for moving the lower platen upwardly to compress a bale of cotton, second piston and cylinder arrangement for actuating said side doors, and linkage connecting one each of said side doors to one each of said second piston and cylinder arrangements, the improvement comprising a pair of substantially stationary hinge plates mounted at opposite sides of said lower platen, hinge brackets, said side doors being hingedly connected to said hinge brackets, said hinge plates and hinge brackets provided with interfitting guides and guideways for movably securing the hinge brackets to the hinge plates, means to lock said hinge brackets in adjusted position in the hinge plates, and an adjustable head in each of said second cylinders for limiting upward movement of said linkage.

4. In a compress of the type having a fixed upper platen, a movable lower platen, a pair of side doors hingedly mounted at their lower ends on opposite sides of said lower platen, a first piston and cylinder arrangement for moving the lower platen upwardly to compress a bale of cotton, second piston and cylinder arrangements for actuating said side doors, and linkage connecting one each of said side doors to one each of said second piston and cylinder arrangements, the improvement comprising a pair of substantially stationary hinge plates mounted at opposite sides of said lower platen, said hinge plates being provided with laterally extending inverted T-slots disposed in spaced parallel relation, said hinge plates also provided with a plurality of laterally spaced sets of longitudinally aligned semi-circular grooves in the top thereof, hinge brackets having inverted T-shaped bases slideable in the inverted T-slots and aligned circular apertures proximate the tops of the hinge plates, said side doors being hingedly connected to said hinge brackets, a cylindrical locking bar extending through the apertures and seating in one set of the grooves, said bar having a flat portion between each hinge bracket whereby the locking bar may be rotated to slide the hinge brackets to another set of longitudinally-aligned grooves and there rotated to lock said hinge brackets to said hinge plates, and an adjustable head in each of said second cylinders for limiting upward movement of said linkage.

5. The improvement of claim 4 including detent means in said hinge brackets and said locking bar releasably locking said locking bar from longitudinal and rotational movement with respect to the hinge brackets.

6. A rolling-bale attachment for a compress of the type having a fixed upper platen, a movable lower platen, a pair of side doors hingedly disposed at opposite sides of the lower platen, and separate power means for swinging the side doors to compressing position and moving the lower platen upwardly for compressing a bale of cotton, said attachment comprising, a pair of hinge plates adapted to be stationarily mounted on opposite sides of said lower platen, hinge brackets, said hinge plates and hinge brackets provided with interfitting guides and guideways movably securing the hinge brackets to the hinge plates, and means to lock the hinge brackets to the hinge plates, said hinge brackets hingedly connected to lower ends of the side doors when the hinge plates are mounted as aforesaid.

7. A rolling-bale attachment for a compress of the type having a fixed upper platen, a movable lower platen, a pair of side doors hingedly disposed at opposite sides of the lower platen, and separate power means for swinging the side doors to compressing position and moving the lower platen upwardly to compressing position for compressing a bale of cotton, said attachment comprising, a pair of hinge plates adapted to be stationarily mounted on opposite sides of said lower platen and provided with laterally-extending inverted T-slots disposed in spaced parallel relation and a plurality of laterally-spaced sets of longitudinally-aligned recesses in the tops of said hinge plates, the surfaces of the recess comprising circular arcs, when viewed in cross section, hinge brackets having inverted T-shaped projections slidable in said inverted T-slots and having longitudinally-aligned circular apertures proximate the tops of the hinge plates, said hinge brackets hingedly connecting lower ends of said side doors when the hinge plates are mounted as aforesaid, and a cylindrical locking bar extending through the apertures and seating in one set of aligned recesses, said bar having a flat portion between each hinge bracket whereby the locking bar may be rotated to slide the hinge brackets to another of the sets of longitudinally-aligned recesses and there rotated to lock said hinge brackets to said hinge plates.

8. The rolling bale attachment of claim 7 including detent means in said hinge brackets and said locking bar releasably locking the locking bar from longitudinal and rotational movement with respect to the hinge brackets.

9. A rolling bale attachment for a compress of the type having a fixed upper platen, a movable lower platen, a pair of side doors pivotally mounted at opposite sides of the lower platen, and separate power means for swinging the side doors to compressing position and moving the lower platen upwardly for compressing a bale of cotton, said power means including linkage connecting the side doors thereto, said rolling bale attachment comprising, a pair of hinge plates adapted to be stationarily mounted on opposite sides of said lower platen, hinge brackets, said hinge brackets and hinge plates provided with interfitting guideways and guide projections for movably securing the hinge brackets to the hinge plates, means to lock the hinge brackets in adjusted position in said hinge plates, said hinge brackets pivotally connecting lower ends of the side doors to the hinge plates when the hinge plates are mounted as aforesaid, and means for limiting movement of said linkage for limiting inward swinging of said side doors.

10. A rolling bale attachment for a compress of the type having a fixed upper platen, a movable lower platen, a pair of side doors pivotally mounted on opposite sides of the lower platen, a first piston and cylinder arrangement for moving the lower platen upwardly to compress a bale of cotton, second piston and cylinder arrangements for swinging the side doors to compressing position, and linkage connecting one each of said side doors to one each of said second piston and cylinder arrangements, said attachment comprising a pair of hinge plates adapted to be stationarily mounted at opposite sides of the lower platen, hinge brackets adjustably mounted on said hinge plates for adjustable movement generally at right angles to the direction of movement of the lower platen, said hinge brackets hingedly connected to the side doors when the hinge plates are mounted as aforesaid, means locking the hinge brackets in adjusted position, and adjustable means for limiting movement of said linkage for limiting inward swinging of said side doors.

11. A rolling bale attachment for a compress having a lower platen and side doors for compressing a bale of cotton, said rolling bale attachment comprising, a pair of hinge plates adapted to be substantially stationarily mounted at opposite sides of the lower platen of the compress, said hinge plates being provided with laterally-extending inverted T-slots disposed in spaced parallel relation, said hinge plates also being provided with a plurality of laterally-spaced sets of longitudinally-aligned semi-circular grooves in the tops thereof, hinge brackets having inverted T-shaped bases slidable in the inverted T-slots and having aligned circular apertures proximate the tops of the hinge plates, the side doors of the compress being hingedly connected to said hinge brackets when the hinge plates are mounted on opposite sides of the lower platen as aforesaid, and a cylindrical locking bar extending through the apertures and seating in one set of the grooves, said bar having a flat portion between each hinge bracket whereby the locking bar may be rotated to slide the hinge brackets to another set of longitudinally-aligned grooves and there rotated to lock said hinge brackets to said hinge plates in adjusted position.

12. The rolling bale attachment of claim 11 including detent means in said hinge brackets and said locking bar releasably locking said locking bar from longitudinal and rotational movement with respect to the hinge brackets.

References Cited in the file of this patent

UNITED STATES PATENTS

| Number | Name | Date |
|---|---|---|
| 730,881 | Crow | June 16, 1903 |
| 739,838 | Crow | Sept. 29, 1903 |
| 828,002 | Webb | Aug. 7, 1906 |
| 923,190 | Luce | June 1, 1909 |
| 1,241,491 | Bickerstaff | Oct. 2, 1917 |
| 1,262,795 | Holen | Apr. 16, 1918 |
| 2,545,378 | Peck | Mar. 13, 1951 |
| 2,604,878 | Stevens | July 29, 1952 |
| 2,622,266 | Stehle | Dec. 23, 1952 |

FOREIGN PATENTS

| Number | Country | Date |
|---|---|---|
| 625,711 | Great Britain | July 1, 1949 |